United States Patent [19]
Baker et al.

[11] Patent Number: 5,906,386
[45] Date of Patent: May 25, 1999

[54] VEHICLE TOW ARRANGEMENT INCLUDING REAR WHEEL SUPPORT AND METHOD OF TOW

[76] Inventors: Ronald T. Baker, 2340 L Westcliffe La., Walnut Creek, Calif. 94596; Victor J. Armbrust, 3404 Noyo St., Oakland, Calif. 94602

[21] Appl. No.: 08/596,906

[22] Filed: Mar. 11, 1996

[51] Int. Cl.$^6$ .................. B60B 30/10; B60P 3/06
[52] U.S. Cl. .................. 280/404; 280/402; 280/79.4
[58] Field of Search ................ 280/404, 402, 280/476.1, 79.4, 767; 180/15, 16; 414/563, 482, 483, 484, 485; 254/28

[56] References Cited

U.S. PATENT DOCUMENTS

| | | | |
|---|---|---|---|
| 2,043,507 | 6/1936 | Culemeyer | 280/404 |
| 2,058,955 | 10/1936 | Culemeyer | 280/404 |
| 3,428,332 | 2/1969 | McCance | |
| 3,430,983 | 3/1969 | Jones | |
| 3,615,105 | 10/1971 | Harris | 280/402 |
| 3,785,517 | 1/1974 | Brajkovich | |
| 3,822,898 | 7/1974 | Brownlie | |
| 3,979,137 | 9/1976 | Lipscomb, Jr. et al. | |
| 3,997,186 | 12/1976 | Pottorff | |
| 4,243,243 | 1/1981 | Edmisten | |
| 4,465,421 | 8/1984 | Murillo | 280/79.4 |
| 4,490,089 | 12/1984 | Welker | 414/483 |
| 4,659,100 | 4/1987 | Welker | 414/483 |
| 4,712,967 | 12/1987 | Farthing | 280/402 |
| 4,763,914 | 8/1988 | Lemmons | |
| 4,784,402 | 11/1988 | Roman | 280/79.4 |
| 4,913,459 | 4/1990 | Smeitink | 280/79.4 |
| 5,145,308 | 9/1992 | Vaughn et al. | |
| 5,228,712 | 7/1993 | Speier | |
| 5,248,235 | 9/1993 | Poten et al. | 280/79.4 |
| 5,362,195 | 11/1994 | Wagner | 414/483 |
| 5,601,303 | 2/1997 | Underwood | 280/475 |
| 5,609,461 | 3/1997 | Lichtenberg | 280/79.4 |

FOREIGN PATENT DOCUMENTS

| | | | |
|---|---|---|---|
| 2613988 | 10/1988 | France | 280/402 |
| 1-132435 | 5/1989 | Japan | 280/402 |

*Primary Examiner*—Brian L. Johnson
*Assistant Examiner*—Gary Savitt

[57] ABSTRACT

A vehicle towing arrangement for towing a vehicle with one end of the towed vehicle being secured to the towing vehicle or extension thereof and the other end of the towed vehicle supported by an independent support component which component has at least one wheel. The support component can be secured to the towed vehicle.

2 Claims, 7 Drawing Sheets

5,906,386

1

VEHICLE TOW ARRANGEMENT INCLUDING REAR WHEEL SUPPORT AND METHOD OF TOW

BACKGROUND OF THE INVENTION

Prior art front wheel engaging towing arrangement for motorcycles have included apparatus into which the front wheel is lifted (U.S. Pat. No. 3,822,898) and apparatus with a ramp for rolling the front wheel up to its towing position (U.S. Pat. Nos. 4,763,914 and 5,145,308).

Towing arrangements which also elevate the rear wheel of a towed motorcycle have also been proposed (U.S. Pat. Nos. 3,979,137; 3,997,186; 4,243,243; 4,763,914; and 5,228,712) but none of these proposals provide a flexible optimal additional wheel towing component for trailing a rear or front wheel.

SUMMARY OF THE INVENTION

Broadly, the present invention is a vehicle tow arrangement and its method of operation for towing wheeled vehicles, and in particular motorcycles and other two wheeled vehicles, comprising a towed vehicle holder mounted on or extending from the towing vehicle to hold one end of the towed vehicle and the towing arrangement having in addition a support for the other end of the towed vehicle in the form of wheeled support dolly component positionable under a wheel of the towed vehicle and connectable to the towed vehicle or towing vehicle. Preferably, the support dolly component is attached to the towed vehicle.

The wheeled support component of the invention is positionable on the ground adjacent to the towed vehicle to permit the towed vehicle to be loaded onto such component preferably using the towing vehicle and without manually lifting the towed vehicle. Alternatively however, the wheel of the towed vehicle can be lifted up and placed on the support section which section includes at least one wheel.

It is also contemplated by the invention that a dual system can tow two (2) two-wheeled vehicles or one four (4) wheeled vehicle.

DESCRIPTION OF THE PREFERRED EMBODIMENT

Figure 1:
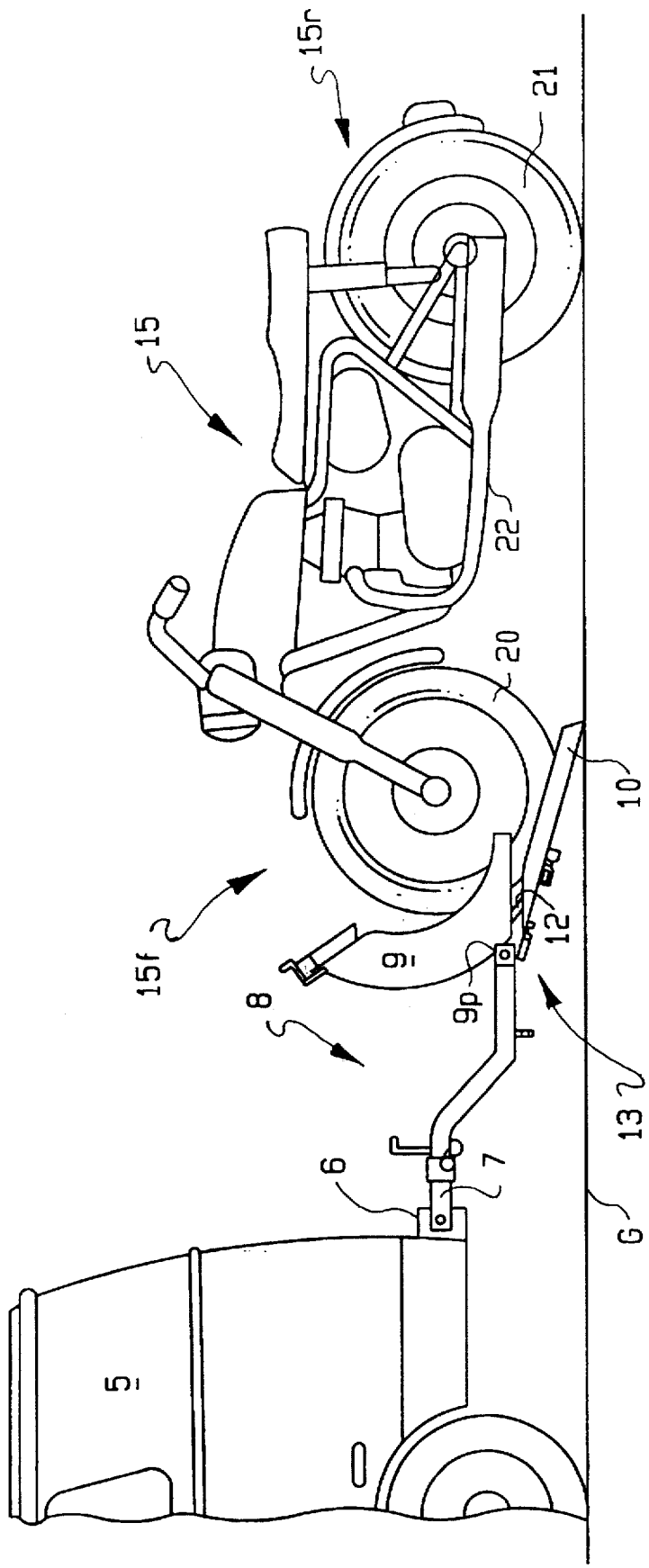
FIG. 1 is a side elevational view of a prior art forward component useful in the towing arrangement of the present invention with the towed vehicle in the process of being loaded.

In FIG. 1, the towing vehicle 5 includes a towing hitch 6 for detachable engagement with the frame 7 of front wheel

2 towing component 8. Hitch 6 supports frame 7 in a cantilever manner. Front wheel towing component 8 includes tiltable cradle 9 and swingable loading ramp 10. Cradle 9 pivots about axis 9p and includes tongue brace 12 to limit its backward pivot. Also shown is towed motorcycle 15 having a front end 15f including wheel 20, rear end 15r including wheel 21 and frame 22. Towing vehicle 5, ramp 10 and rear wheel 21 of towed motorcycle 15 are positioned on ground G in FIG. 1.

While FIG. 1 shows a prior art method of supporting the front end 15f of vehicle 15 using a wheel cradle mounted on the towing vehicle hitch, it is understood that any suitable holder support on the towing vehicle 5 or extending from it may be used including the arrangement of FIG. 7 which is further described below.

Figure 2:
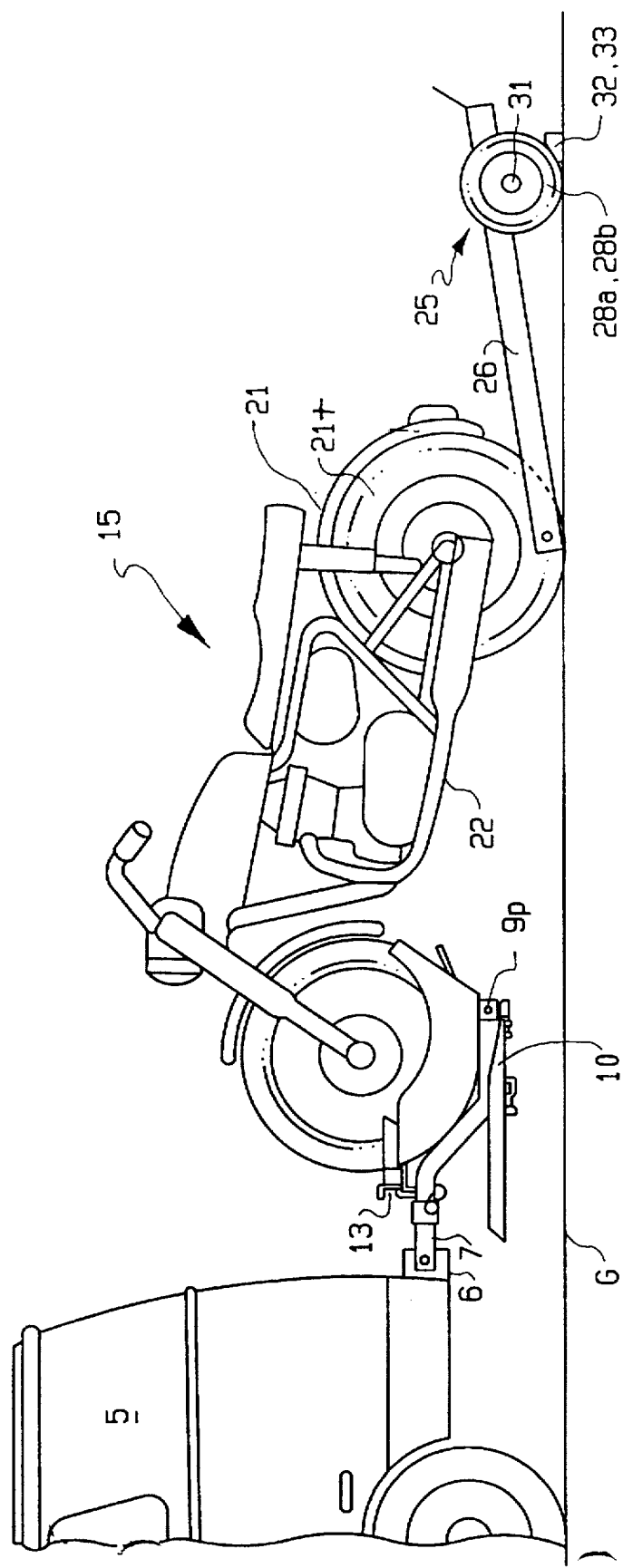
FIG. 2 is a side elevational view of the forward and rear components of the present invention with the forward wheel of the towed vehicle loaded into the forward component.
Figure 3:
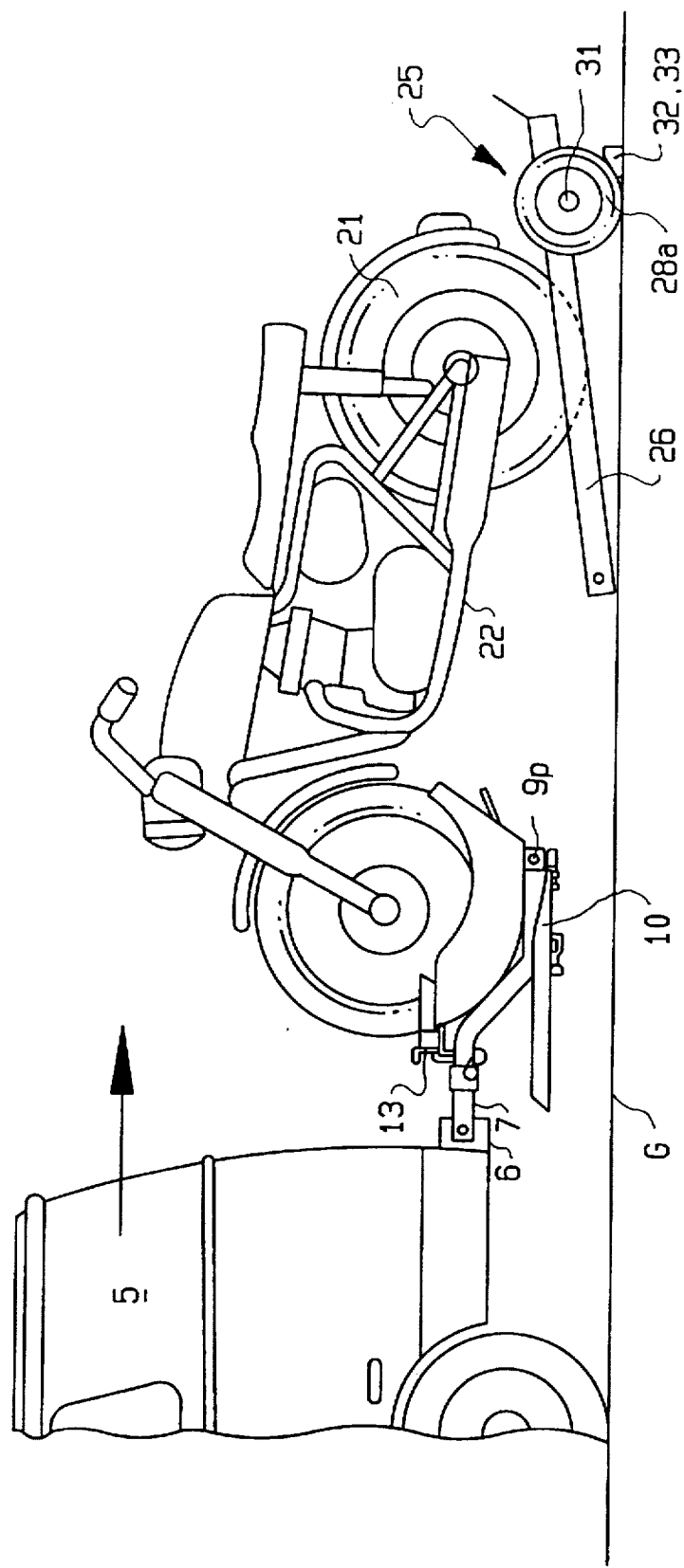
FIG. 3 is a side elevational view of the towing vehicle backing to cause the rear wheel of the towed vehicle to enter onto the rear component.
Figure 4:
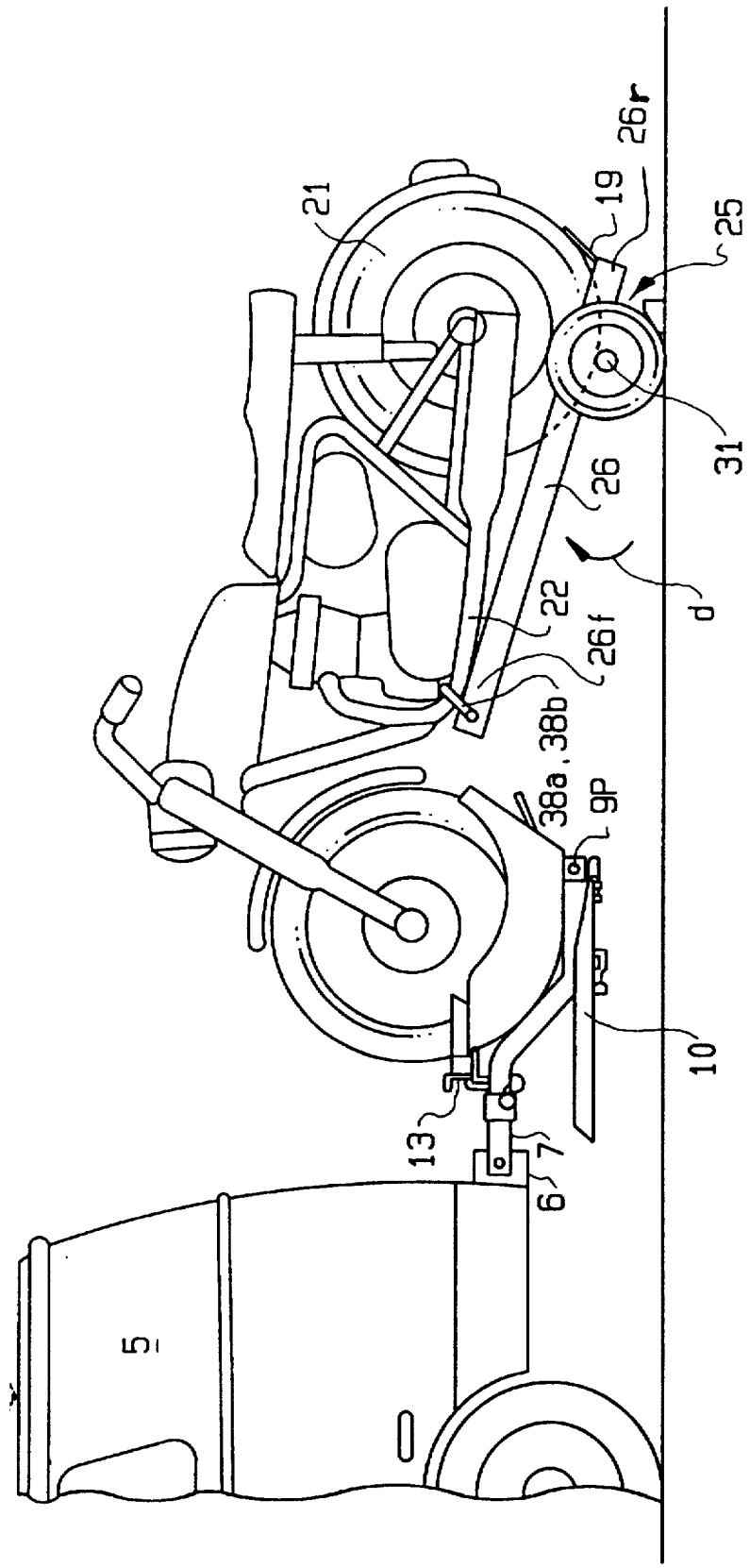
FIG. 4 is a side elevational view of the towing vehicle further backed to place the towing vehicle rear wheel in towing position.
Figure 5:
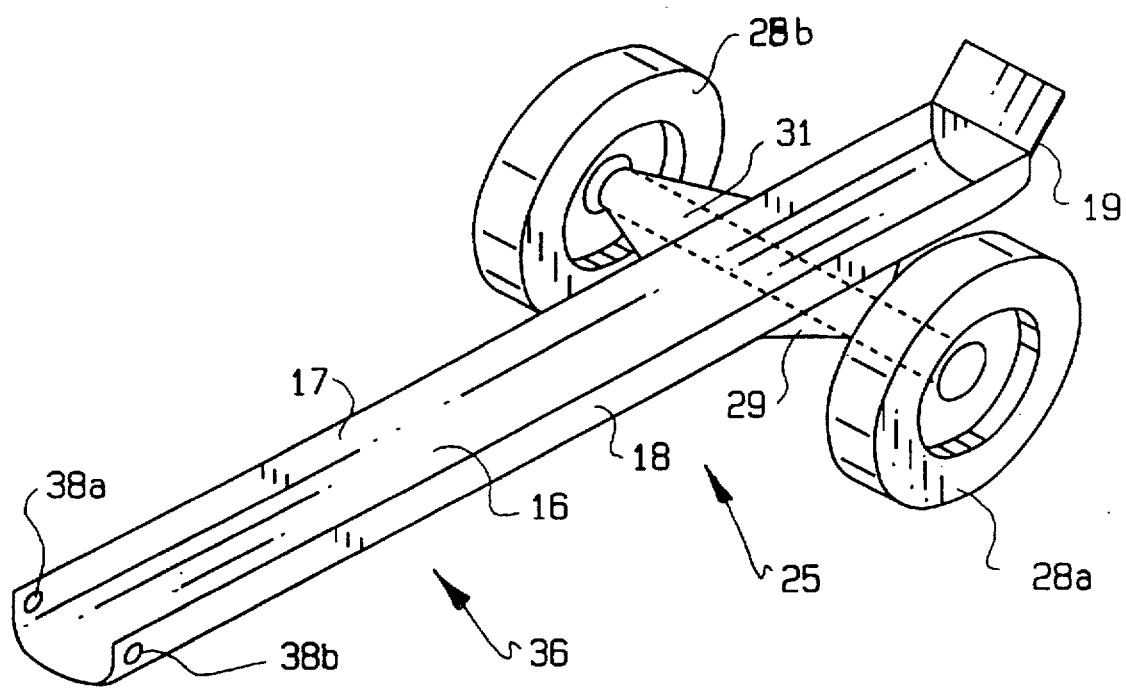
FIG. 5 is a perspective view of the rear component of the towing arrangement.

Turning to FIGS. 2-5, rear wheeled support dolly component 25 includes wheel support channel 26 with channel bottom 16, right sloping guide side 17 and left sloping guide side 18. Channel 26 is slightly wider than tire 21t of rear wheel 21 to assist in aligning channel 26 when channel 26 is used as a loading ramp as further explained. Component 25 also includes wheels 28a, 28b, axle frame 29 and axle 31 secured to frame 29 (FIG. 5). Alternatively, axle 31 can be mounted on or attached directly to channel 26. Component 25 may also be constructed with one wheel properly centered. After the front wheel 20 of motorcycle 19 is mounted in cradle 9, cradle latch 13 locked and ramp 10 pivoted to its stowed towing position, rear wheel towing component 25 is moved into its loading position behind rear wheel 21 (FIG. 2). Next, backup blocks 32, 33 are placed behind component wheels 28a, 28b to prevent backward movement of dolly component 25 along ground G during loading. Referring now to FIG. 3, towing vehicle 5 is backed up causing rear motorcycle wheel 21 to roll up channel 26. As rear wheel 21 rolls past axle 31 the weight of motorcycle 15 causes rear wheel component 25 including its channel 26 to rotate clockwise in direction d (FIG. 4). Wheel stop end 19 limits backward movement of rear wheel 21 (see FIGS. 4 and 5). Rotation of component 25 is limited by channel 26 engaging motorcycle frame 22. Wheeled dolly component 25 is then tied to motorcycle 15 using tie straps 38a, 38b.

Alternatively, rear wheel 21 may be loaded onto wheel support channel 26 without using channel 26 as a ramp. Wheel 21 and the rear end 15r of vehicle 15 maybe lifted up and placed on channel 26.

Figure 6:
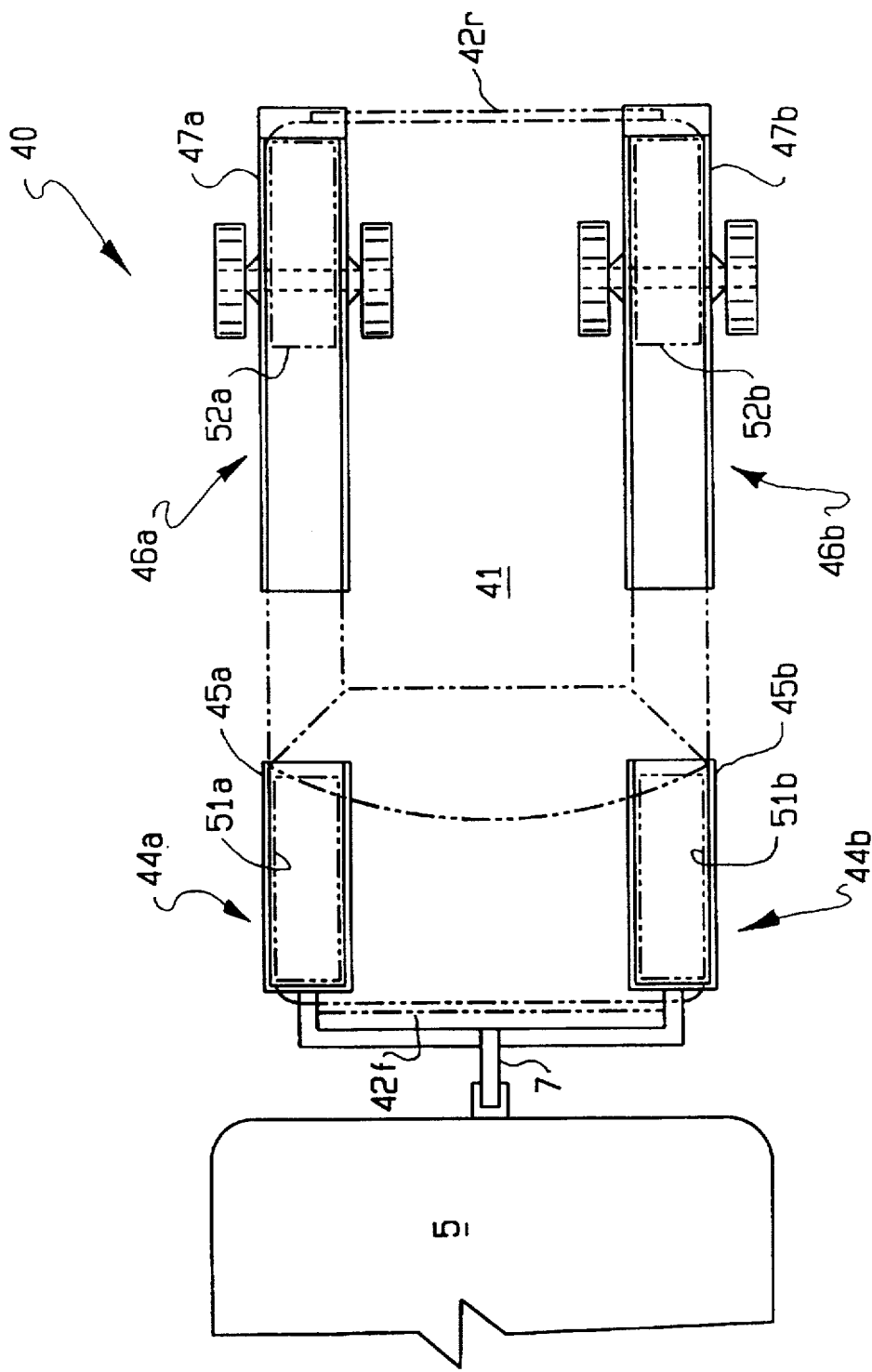
FIG. 6 is a further embodiment showing a dual towing arrangement for towing a four wheel vehicle or a pair of two wheel vehicles.

Turning to FIG. 6, another embodiment of the invention is shown in which the dual tow arrangement 40 for towing a four (4) wheel vehicle 41 with front and rear bumpers 42f, 42r, front wheels 51a, 51b and rear wheels 52a, 52b. The arrangement 40 includes two front wheel towing components 44a, 44b with wheel cradles 45a, 45b and two (2) rear wheel components 46a, 46b with ramps 47a, 47b. Tow arrangement 40 can be used to tow two (2) motorcycles or other two wheel vehicles.

Figure 7:
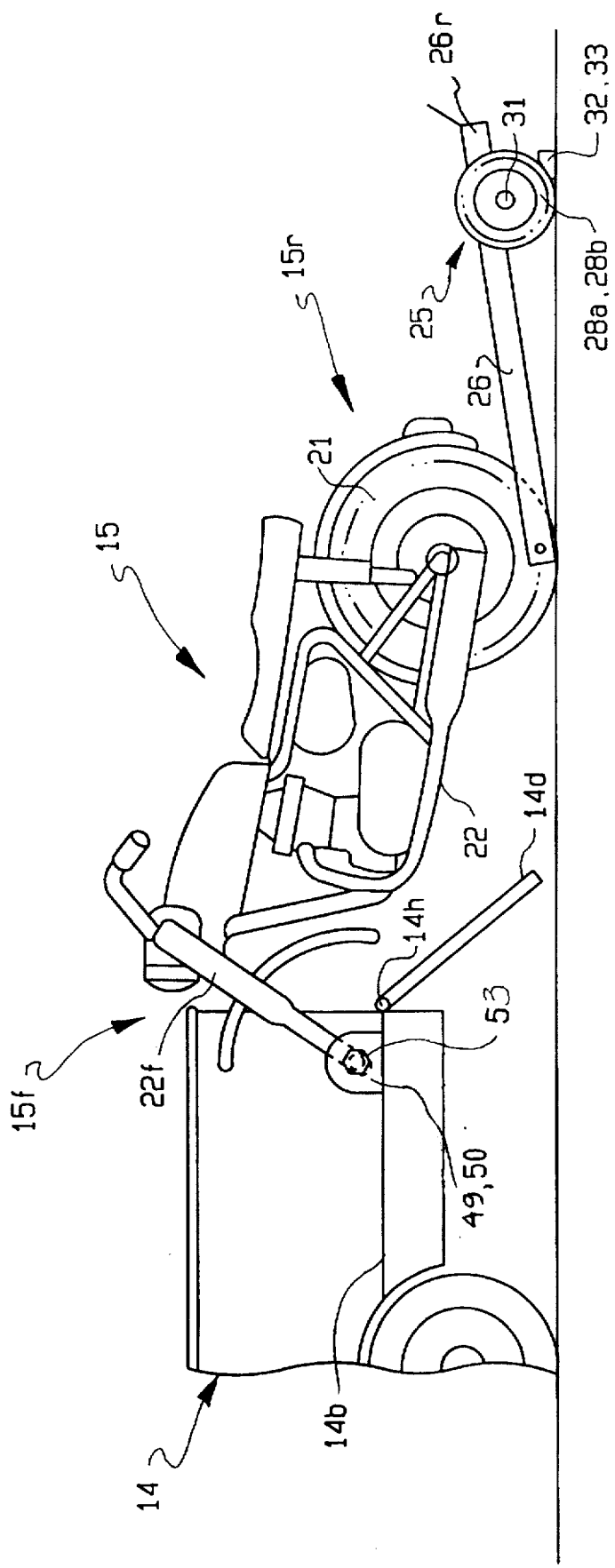
FIG. 7 is a side elevational view of an alternative embodiment with the front of the towed vehicle secured to a pick-up truck bed.

Finally, FIG. 7 depicts an alternative towing arrangement in which the front end 15f of the towed vehicle is positioned on the bed 14b to pick-up truck 14. The towed vehicle fork 22f is connected to two (2) spaced-apart eyelet brackets 50, 51 welded to truck bed 14b using bolt 52 and a nut (not shown).

Most broadly, the invention is operated by securing either end of the towed vehicle 15 to towing vehicle 5 or 14. The other end of vehicle 15 is then placed by rolling, lifting or otherwise on dolly component 25. The dolly component 25 is then tied or otherwise secured to towed vehicle 15 or towing vehicles 5, 14.

More specifically, in the operation of the towing apparatus of FIGS. 1–5 and 7, front wheel 20 of towed vehicle 15 is positioned for towing by rolling the front wheel up ramp 10 and into wheel cradle 9 or front wheel 20 can be otherwise placed in cradle 9. Alternatively, non-cradle front wheel mounting arrangements may be used which secure the front end of the towed vehicle to a location on the towing vehicle 5 or on any suitable support extending from the rear of vehicle 5 (see FIG. 7).

Once the front end 15f of vehicle 15 is positioned and secured for towing, the rear wheel dolly support component 25, which can be moved independently of the towing or towed vehicle, is rolled to a position adjacent and behind the rear motorcycle wheel 21 (FIG. 2). Blocks 32, 33 are placed behind the rear wheels 28a, 28b to prevent dolly component 25 from rolling back during motorcycle rear wheel loading.

Next, the towing vehicle 5 (with the front end 15f of the towed vehicle 15 secured to it) is backed up, to cause the motorcycle rear wheel 21 to roll onto and then up the channel bottom 16 of inclined channel 26. The sides 17, 18 of channel 26 assist in guiding rear wheel 21 as it rolls up channel 26. When rear wheel 21 has moved up on channel 26 to a point where its weight (and the weight of the rest of motorcycle 15) pass rear axle 31, dolly component 25 rotates until the front portion 26f of channel 26 engages the frame 22 of vehicle 15. The movement of rear wheel 21 on channel 26 is limited by frame end stop 19. Finally, channel 26 is secured to the towed vehicle using connector straps 38a, 38b; however, when wheel 21 fits properly in channel 26 and channel 26 is urged against towed vehicle 15 connector means may not be needed. Channel 26 can alternatively be secured to the towing vehicle or any extension thereof. Unloading is accomplished by performing the above steps in reverse order. Channel 26 need not be configured to function as a ramp and in such instances channel 26 can be shorter than depicted in the Figures. Channel 26 need only function as a wheel support and not as a ramp when towed vehicle 15 is light enough to be lifted into towing position on channel 26.

Dolly component 25 and blocks 32, 33 may be readily stored in towing vehicle 5 or 14 when not in use. A motorcycle or other two-wheeled vehicle may, if convenient, alternatively be towed rear wheel first. To accomplish such towing, rear wheel 21 is first secured to towing vehicle 5 and then the front wheel 22 is loaded upon and secured to dolly component 25.

Similar operating procedures may be used to load a four (4) wheel vehicle or a pair of two wheeled vehicles on dual tow arrangement 40.

We claim:

1. A vehicle towing system for use with two vehicles where one vehicle is a towing vehicle and the other is a towed vehicle and whereby the system allows towing of a vehicle along a road surface, and whereby the system has a plurality of wheels at a rear end of the vehicle towing system, the towing system comprising:

a means for securing and supporting a forward end of the towed vehicle to the towing vehicle, including a structure to receive and carry a front wheel of the towed vehicle above the road surface;

an independent wheeled support component, which is not connected to the forward securing and supporting means, for a rear wheel of a rear end of the towed vehicle, which includes a wheel receiving structure, said wheel receiving structure including a single beam with a longitudinal axis and with a ramp cavity extending along the entire longitudinal axis of the beam, said ramp cavity being shaped to receive and capable of fully supporting the rear wheel of the towed vehicle and which includes a plurality of wheels attached to the beam and arranged near a rear end of the beam and positioned along the longitudinal axis of the beam in such a way as to cause one end of the beam to rest against the road surface when the beam is unloaded and at rest and to thereby assume a first position and thereby form a one piece and continuous ramp structure, and whereby said one piece continuous ramp structure rotates about an axis that is transverse to the longitudinal axis as a towed vehicle wheel is rolled up the one piece continuous ramp structure, said transverse axis coinciding with an axis of rotation of at least one of the plurality of wheels attached to the beam, and whereby the one piece continuous ramp structure has a second position after rotation that is closer to horizontal; and whereby the independent wheeled support component forms a one piece continuous structure that rotates as a complete unit and is capable of loading and supporting a wheel of the towed vehicle without the use of a ramp in addition to the single piece continuous ramp;

a means for securing and supporting the forward end of the wheeled support component to the towed vehicle.

2. The vehicle towing system of claim 1 in which the wheel receiving structure includes a stop to prevent the towed vehicle wheel from rolling off the back.

\* \* \* \* \*